US012754598B2

(12) United States Patent
Begum et al.

(10) Patent No.: US 12,754,598 B2
(45) Date of Patent: Oct. 6, 2026

(54) DYNAMIC VOLTAGE AND FREQUENCY SCALING FOR MEMORY IN HETEROGENEOUS CORE ARCHITECTURES

(71) Applicant: Intel Corporation, Santa Clara, CA (US)

(72) Inventors: Rizwana Begum, Sachse, TX (US); Rohit Sharad Phatak, Hillsboro, OR (US); Eric Heit, Hillsboro, OR (US); Xiangdong Lou, Poway, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/942,415

(22) Filed: Sep. 12, 2022

(65) Prior Publication Data

US 2024/0086088 A1 Mar. 14, 2024

(51) Int. Cl.

| | |
|---|---|
| ***G06F 1/324*** | (2019.01) |
| ***G06F 1/3225*** | (2019.01) |
| ***G06F 1/3234*** | (2019.01) |
| ***G06F 3/06*** | (2006.01) |

(52) U.S. Cl.

CPC ............ *G06F 1/324* (2013.01); *G06F 1/3225* (2013.01); *G06F 1/3275* (2013.01); *G06F 3/0625* (2013.01); *G06F 3/0653* (2013.01); *G06F 3/0673* (2013.01); *Y02D 10/00* (2018.01)

(58) Field of Classification Search

CPC .... G06F 1/3203; G06F 1/3206; G06F 1/3225; G06F 1/324; G06F 1/3275; G06F 3/0625; G06F 3/0653; G06F 3/0673; G06F 1/3296; G06F 13/1652; G06F 13/1668; Y02D 10/00

See application file for complete search history.

(56) References Cited

U.S. PATENT DOCUMENTS

2009/0193201 A1* 7/2009 Brittain ............... G06F 13/1689 711/E12.001
2015/0095620 A1* 4/2015 Ananthakrishnan ......................... G06F 9/30083 712/220
2015/0378424 A1* 12/2015 Anyuru ................. G06F 1/3296 713/320

(Continued)

*Primary Examiner* — Thomas J. Cleary

(74) *Attorney, Agent, or Firm* — Schwabe, Williamson & Wyatt, P.C.

(57) ABSTRACT

Embodiments described herein may include apparatus, systems, techniques, and/or processes that are directed to optimizing memory frequency based on the bandwidth and latency needs of heterogeneous processing cores in a computer system. According to various embodiments, adjustments to the frequency of memory may be applied differently depending on the type of core requesting more bandwidth and/or faster response. According to various embodiments, the frequency is increased more sparingly for energy-efficient cores, while the frequency is increased more generously for high-performance cores. Additionally, when memory traffic decreases, the frequency of memory is decreased more generously when the previous request for higher frequency was from an energy-efficient core than a high-performance core. By considering the type of core that is requesting more bandwidth and/or faster response, performance and power consumption may be more optimally balanced.

20 Claims, 6 Drawing Sheets

(56) References Cited

U.S. PATENT DOCUMENTS

| | | | | |
|---|---|---|---|---|
| 2017/0212581 | A1* | 7/2017 | Park | G06F 12/0802 |
| 2020/0183597 | A1* | 6/2020 | Das | G06F 1/3275 |
| 2021/0157700 | A1* | 5/2021 | Dorsey | G06F 11/3409 |
| 2022/0058029 | A1 | 2/2022 | Mubeen et al. | |
| 2022/0197519 | A1 | 6/2022 | Kuo et al. | |
| 2022/0199142 | A1 | 6/2022 | Mathiyalagan et al. | |
| 2024/0329711 | A1* | 10/2024 | Begum | G06F 1/3215 |

* cited by examiner

DYNAMIC VOLTAGE AND FREQUENCY SCALING FOR MEMORY IN HETEROGENEOUS CORE ARCHITECTURES

TECHNICAL FIELD

Embodiments generally relate to computer systems, in particular, to controlling frequency of memory to conserve battery life or provide system performance.

BACKGROUND

Dynamic Voltage and Frequency Scaling (DVFS) is a technique used to trade-off memory performance (bandwidth and latency) for power savings. In simple systems, a lower frequency for a processing core is typically used if a computer system is in a battery save mode, while higher frequencies are used if a computer system requires performance. In more complex systems, DVFS requires intelligent algorithms that decide optimal frequency and/or voltage for computer systems. As computer systems become more complex, for example, including multiple heterogeneous cores running various threads and large memory systems, opportunities arise for more complex algorithms to achieve optimal performance and/or power savings benefits.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
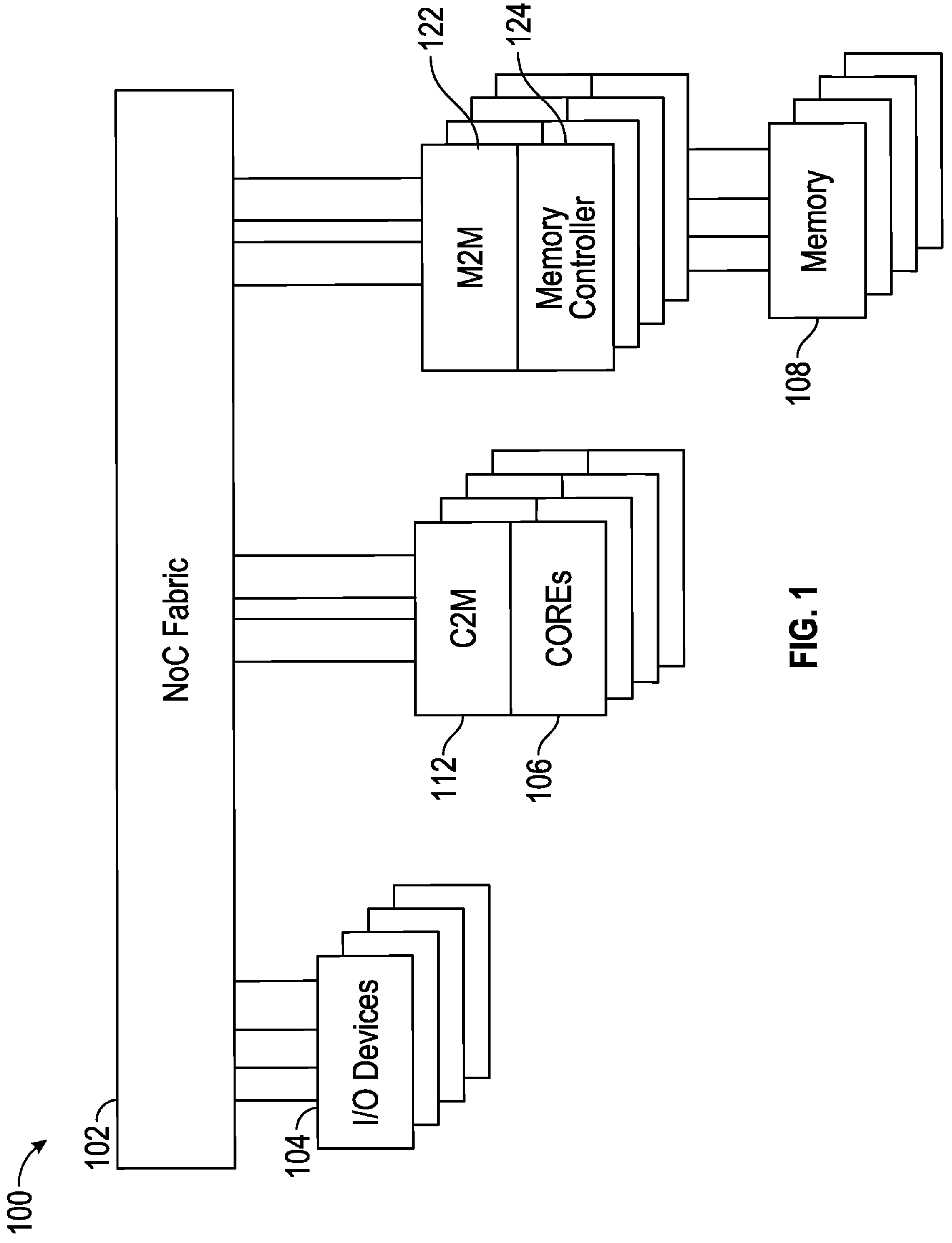
FIG. 1 illustrates a computing system in accordance with various embodiments.

Embodiments described herein may include apparatus, systems, techniques, and/or processes that are directed to optimizing memory frequency based on the bandwidth and latency needs of heterogeneous processing cores in a computer system. According to various embodiments, adjustments to the frequency of memory may be applied differently depending on the type of core requesting more bandwidth and/or faster response. According to various embodiments, the frequency is increased more sparingly for energy-efficient cores, while the frequency is increased more generously for high-performance cores. Additionally, when memory traffic decreases, the frequency of memory is decreased more generously when the previous request for higher frequency was from an energy-efficient core than a high-performance core. By considering the type of core that is requesting more bandwidth and/or faster response, performance and power consumption may be more optimally balanced.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 illustrates a computing system in accordance with various embodiments. System 100 may be any type of computing platform, ranging from small portable devices such as smartphones, tablet computers and so forth to larger devices such as client systems, for example, desktop or workstation systems, server systems and so forth. System 100 includes a Network on a Chip (NoC) fabric 102 through which one or more I/O devices 104 and one or more cores 106 communicate to a memory 108. Coupled to cores 106 are core-to-mesh (C2M) units 112. C2M units 112 operate to process requests from cores 106 for memory transactions and send corresponding transactions to memory 108. C2M units 112 may further process the memory transaction from the core, for example, by mapping a virtual address to a physical address, and the like to generate the corresponding memory transaction sent to memory 108 through NoC fabric 102.

According to various embodiments, cores 106 may be any size and type of computing core, for example, large computing system or small microcontroller, graphics processing unit (GPU), neural network, video processing core, matrix core and the like.

In an embodiment, each core 106 and C2M 112 are components of a system on a chip (SoC). In an embodiment, multiple cores 106 and one or more C2M 112 are components of a SoC. In an embodiment, the majority of the components of system 100 are in a single package with multiple chips or multiple systems on a single chip (SoC).

A mesh to memory (M2M) unit 122 receives and processes received memory transactions from NoC fabric 102 for memory controller 124. These received memory transactions may originate from any of I/O devices 104 and cores 106 and possibly other devices not shown. Memory controller 124 controls memory accesses to memory 108. Memory 108 may be implemented as a shared virtual memory (SVM). In an embodiment, memory access controller 124 and M2M 122 are components of a SoC. In an embodiment, memory 108, memory controller 124 and the M2M 122 are components of a SoC. In an embodiment, memory controller 124, M2M 122, cores 106 and C2M 112 are components of a system on a chip (SoC).

According to various embodiments, memory controller 124 may be used to control one or more different memory system clock domains, or channels, each for servicing a combination of different core types and employing a clock frequency method as described herein.

Examples of I/O devices 104 and cores 106 include, but are not limited to, central processing units (CPUs), graphic processing units (GPUs), various peripheral component interconnect express (PCIe) devices, virtual machines (VMs), processes, a phase-locked loop (PLL) unit, an input/output (I/O) unit, an application specific integrated circuit (ASIC) unit, a field-programmable gate array unit, a graphics card, a III-V unit, an accelerator, and a three-dimensional integrated circuit (3D IC). Note that some I/O devices 104 and/or cores 106 may include a processor complex which may include one or more cores or processing engines.

In system 100, cores 106 may be heterogeneous, that is, diverse cores. For example, one of cores 106 may be a large processing engine designated to run foreground and/or high-performance applications. Another of cores 106 may be a small computing engine designated to run low priority background processes. Additionally, another of cores 106 may be on a low power domain of system 100, also processing low priority background processes.

While a configuration of system 100 has been described, alternative embodiments may have different configurations. While system 100 is described as including the components illustrated in FIG. 1, alternative embodiments may include additional components that facilitate the operation of system 100.

Figure 2:
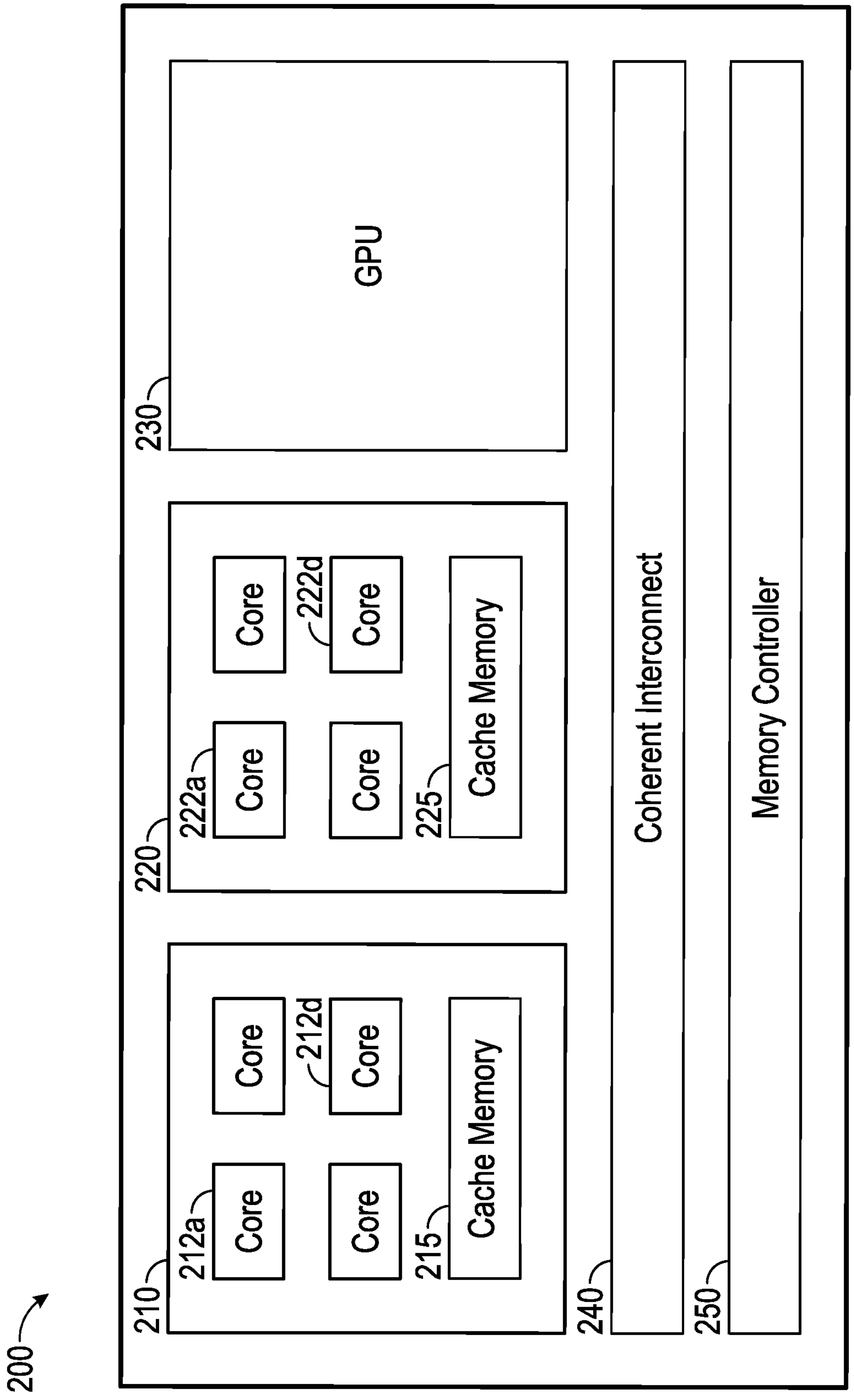
FIG. 2 illustrates a block diagram of a representative system on a chip (SoC) in accordance with various embodiments.

Referring now to FIG. 2, shown is a block diagram of a representative SoC in accordance with various embodiments. In the embodiment shown, SoC 200 may be a multi-core SoC configured for low power operation to be optimized for incorporation into a smartphone or other low power device such as a tablet computer, phablet, or other portable computing device. As an example, SoC 200 may be implemented using asymmetric or different types of cores, such as combinations of higher power and/or low power cores, e.g., out-of-order cores and in-order cores. In different embodiments, these cores may be based on a mix of architectural design cores implemented in a given SoC.

As seen in FIG. 2, SoC 200 includes a first core domain 210 having a plurality of first cores **212*a*-212*d*. In an example, these cores may be low power cores such as in-order cores. In turn, these cores couple to a cache memory 215 of core domain 210. In addition, SoC 200 includes a second core domain 220. In the illustration of FIG. 2, second core domain 220 has a plurality of second cores 222*a*-222*d*. In an example, these cores may be higher power-consuming cores than first cores 212. In an embodiment, the second cores may be out-of-order cores. In turn, these cores couple to a cache memory 225 of core domain 220. Note that while the example shown in FIG. 2** includes 4 cores in each domain, understand that more or fewer cores may be present in a given domain in other examples.

With further reference to FIG. 2, a graphics domain 230 also is provided, which may include one or more graphics processing units (GPUs) configured to independently execute graphics and other workloads, e.g., provided by one or more cores of core domains 210 and 220. As an example, GPU domain 230 may be used to provide display support for a variety of screen sizes, in addition to providing graphics and display rendering operations.

As seen, the various domains couple to a coherent interconnect 240, which in an embodiment may be a cache coherent interconnect fabric that in turn couples to an integrated memory controller 250. Coherent interconnect 240 may include a shared cache memory, such as an L3 cache, in some examples. In an embodiment, memory controller 250 may be a direct memory controller to provide for multiple channels of communication with an off-chip memory, such as multiple channels of a DRAM (not shown for ease of illustration).

In different examples, the number of the core domains may vary. For example, for a low power SoC suitable for incorporation into a mobile computing device, a limited number of core domains such as shown in FIG. 2 may be present. Still further, in such low power SoCs, core domain 220 including higher power cores may have fewer numbers of such cores. For example, in one implementation two cores 222 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional logic may be present, in that an SoC can be scaled to higher performance (and power) levels for incorporation into other computing devices, such as desktops, servers, high-performance computing systems, base stations and the like. As one such example, 4 core domains each having a given number of out-of-order cores may be provided. Still further, in addition to optional GPU support, one or more accelerators to provide optimized hardware support for particular functions (e.g. web serving, network processing, switching or so forth)

also may be provided. In addition, an input/output interface may be present to couple such accelerators to off-chip components.

As illustrated, memory controller 124 of FIG. 1 and memory controller 250 of FIG. 2 receive memory access requests from multiple heterogeneous cores. These cores process diverse applications that have diverse performance requirements. Each of the cores may run at a different frequency and voltage level, each of which may be dynamically adjusted per the needs of the application and core. To achieve maximum power and performance benefits, the frequency of memory 108 of FIG. 1 and the off-chip memory of FIG. 2 (not shown) may also be dynamically adjusted according to various embodiments.

Figure 3:
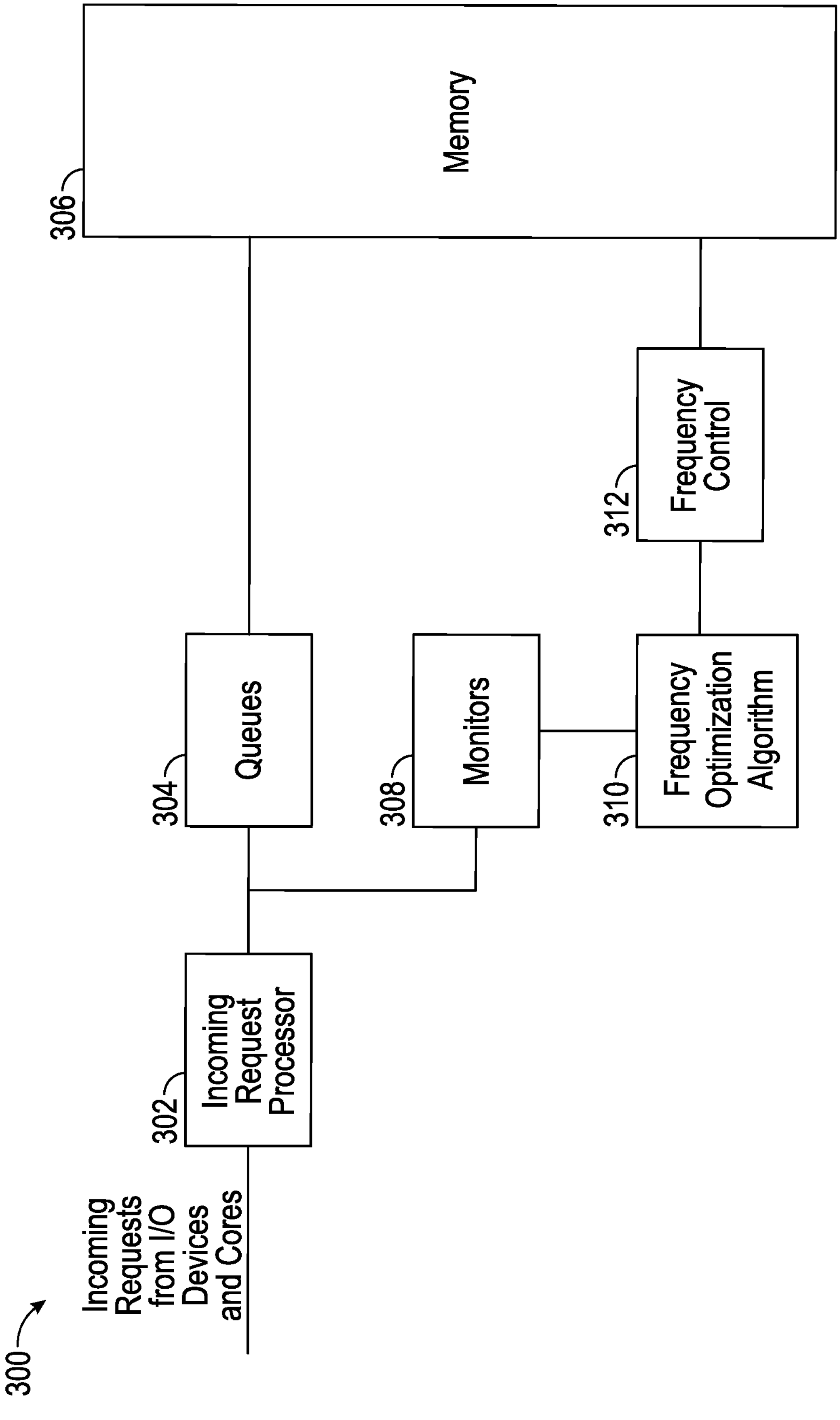
FIG. 3 illustrates a portion of a memory controller in accordance with some embodiments.

FIG. 3 illustrates a portion of a memory controller in accordance with some embodiments. Memory controller 300, as an example of memory controller 124 of FIG. 1 or memory controller 250 of FIG. 2, receives and processes memory transaction requests from I/O devices and multiple heterogeneous cores with an incoming request processor 302. Memory requests are queued in queue 304 before being sent to memory 306. Memory transaction requests are monitored by traffic monitors 308. Traffic monitors 308 may monitor such data as bandwidth and latency as well as the number and source of memory requests.

Frequency optimization algorithm 310 analyzes data provided by traffic monitors 308 and the bandwidth and latency requests received from different cores in order to determine the most optimal operating frequency of memory 306. For example, if frequency optimization algorithm 310 receives a request for more bandwidth and/or faster response from a high-performance core, frequency optimization algorithm 310 may increase the frequency to the requested level. Alternatively, if frequency optimization algorithm 310 receives a request for more bandwidth and/or faster response from a energy-efficient core, frequency optimization algorithm 310 may only increase the frequency a small amount. In this way, performance and power consumption may be more optimally balanced.

According to another embodiment, frequency optimization algorithm 310 may also incrementally increase the frequency of memory for requests from high-performance cores, although those increases may be larger incremental increases than the incremental increases provided for requests from energy-efficient cores.

According to another embodiment, when traffic conditions allow, the frequency of memory may decrease incrementally as well. Frequency optimization algorithm 310 may incrementally decrease the frequency of memory, although the decreasing increment may be a larger incremental decrease when the previous request for an increase was from an energy-efficient core than the incremental decrease provided when the previous request for an increase was from a high-performance core.

Frequency optimization algorithm 310, upon determining an adjustment is needed, notifies frequency controller 312 which may then adjust the frequency of memory 306.

Memory DVFS may require a combination of hardware, software, and firmware infrastructure. All or portions of traffic monitors 308 and/or frequency optimization algorithm 310 may optimally be performed in firmware, but portions may also be implemented as circuitry, software, operating system and/or power management functions and the like. According to some embodiments, hardware may support the actual change of frequency and firmware may select the optimal frequency, and software may train the memory at all the operating frequencies during boot time.

While the present disclosure has been described with respect to a limited number of implementations, those skilled in the art, having the benefit of this disclosure, will appreciate numerous modifications and variations therefrom.

Frequency optimization algorithm 310 may further use multiple other factors in the determination of the optimal frequency and timing of any adjustments, including varying quality of service (QoS) requirements of each type of core in the system, energy-performance preference, hysteresis factors and the like. According to some embodiments, frequency optimization algorithm 310 delivers better memory performance when foreground tasks are most active and better energy efficiency when background tasks are most active.

Figure 4:
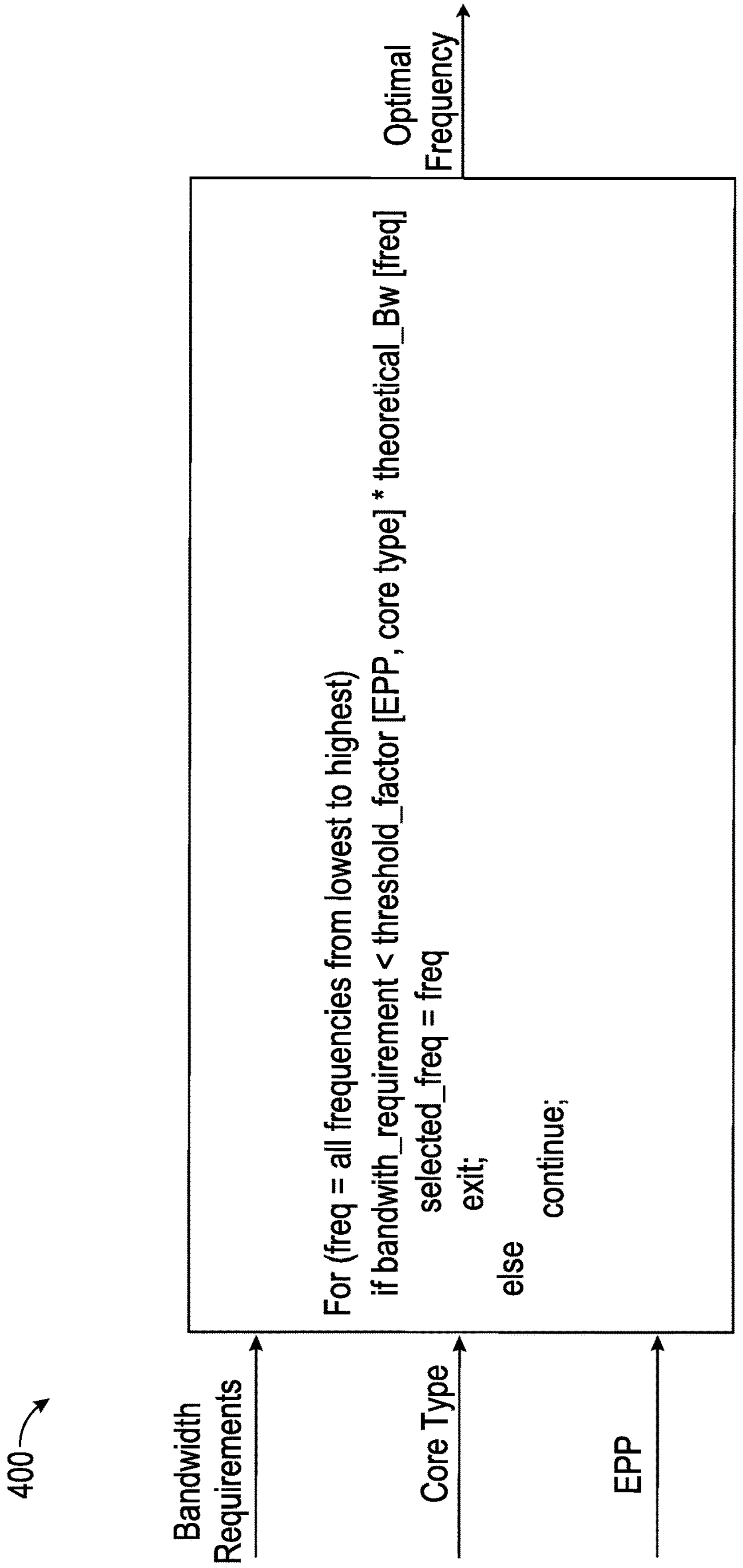
FIG. 4 illustrates a simplified version of an algorithm according to various embodiments.

FIG. 4 illustrates a simplified version of a frequency selection algorithm according to an embodiment. Traditionally frequency decisions have been based simply on bandwidth and latency needs of applications. According to various embodiments, algorithm 400 further considers what type of core is requesting bandwidth increases and/or latency decreases. According to various embodiments, algorithm further considers energy-performance preference.

As shown, algorithm 400 compares a bandwidth requirement with a bandwidth threshold at each frequency starting from lowest to highest. The algorithm selects the lowest frequency that satisfies the bandwidth requirements. Bandwidth threshold at a given frequency is calculated by multiplying the theoretical bandwidth at that frequency with a 'threshold_factor'. According to various embodiments, the threshold_factor is scaled based on what type of core is requesting bandwidth increases and/or latency decreases. Further, the threshold_factor may be scaled based on energy-performance preference.

Taking an example of frequency that provides 20 GBPS of theoretical bandwidth combined with a threshold_factor of 0.5 makes the algorithm select the frequency for bandwidth requirements of less than 10 GBPS. Any requirement greater than 10 GBPS makes the algorithm choose higher frequencies. So, the higher the threshold_factor is, the higher the residencies are at lower frequencies. A lower factor makes the selection of higher frequencies easier increasing residencies at higher frequencies. Lower threshold_factor is desirable for delivering higher performance, while a higher value improves energy efficiency.

According to embodiments of the invention, the awareness of heterogeneous cores, including high-performance and energy-efficient cores, is incorporated into the determination of optimal frequency to achieve better performance for responsiveness-critical applications and better battery life for background and low-priority applications. According to some embodiments, threshold_factor is scaled differently for high-performancy and energy-efficient cores. For example, threshold_factor may be scaled down for foreground/responsive and performance-critical applications and scaled up for background tasks. Note that the lower values of threshold_factor are desirable for higher performance According to an embodiment, starting with a baseline threshold_factor of 0.5 (for example), when performance is preferred, threshold_factor may be scaled down to 0.2 for big core applications and 0.3 for other applications running on other cores resulting in higher memory performance for applications running on big cores. Similarly, for energy efficiency preference, threshold_factor may be scaled up to 0.85 for small cores and 0.65 for high performance cores making memory more energy efficient.

System needs for higher performance and/or longer battery hours vary based on application, battery charge level, availability of charging stations, and the like. For example, it is common to see a computer system OS provide a slider bar for a user to provide performance and battery life preferences by adjusting the slider position from power conservation at one end to best performance at the other end. Operating systems pass on the notion of energy-performance preference derived based on user input, battery charge level and the like to SoCs. The energy-performance preference may be provided per application thread to the SoCs.

Energy-performance preference may be provided per thread basis and therefore varies across cores. In a system with multiple big and small cores, given that memory is a common system resource, algorithm 400 may determine a weighted average of energy-performance preference (EPP) across all cores as shown below $$\text{Aggregated\_EPP} = \text{sum}(\text{weight\_corei} * \text{EPP\_corei}) / \text{number of cores}$$

Weight_corei is a weight associated with core 'i' and EPP_corei is energy-performance preference of the same core. Weight_corei can be chosen such that high-performance cores result in lower aggregated EPP (for performance), and energy-efficient cores result in higher aggregated EPP (for energy efficiency).

The threshold_factor may be scaled down when performance is preferred and scaled up when energy-efficiency is desired. For example, a nominal value of 0.5 for threshold_factor may be scaled down to 0.25 for performance or scaled up to 0.75 for battery life preference. Taking the same example as above, with a frequency capable of 20 GBPs of theoretical bandwidth, threshold_factor of 0.25 makes the algorithm select higher frequencies when bandwidth requirement is above 5 GBPs providing smaller round-trip latency even for lower bandwidth requirements thereby improving responsiveness. When battery life is preferred, threshold_factor of 0.75 ensures that memory operates at lower frequencies unless the bandwidth request exceeds 15 GBPs. This results in lower power consumption.

According to some embodiments, other factors such as latency, hysteresis, and the like may be used in the algorithm. The threshold_factor may be scaled to deliver best performance or battery life or balanced power-performance based on system preferences, type of active cores, and applications priority.

Exact numbers for the threshold_factor are system dependent and changes based on the number and type of processing cores, the capabilities of the memory, and the like.

Figure 5:
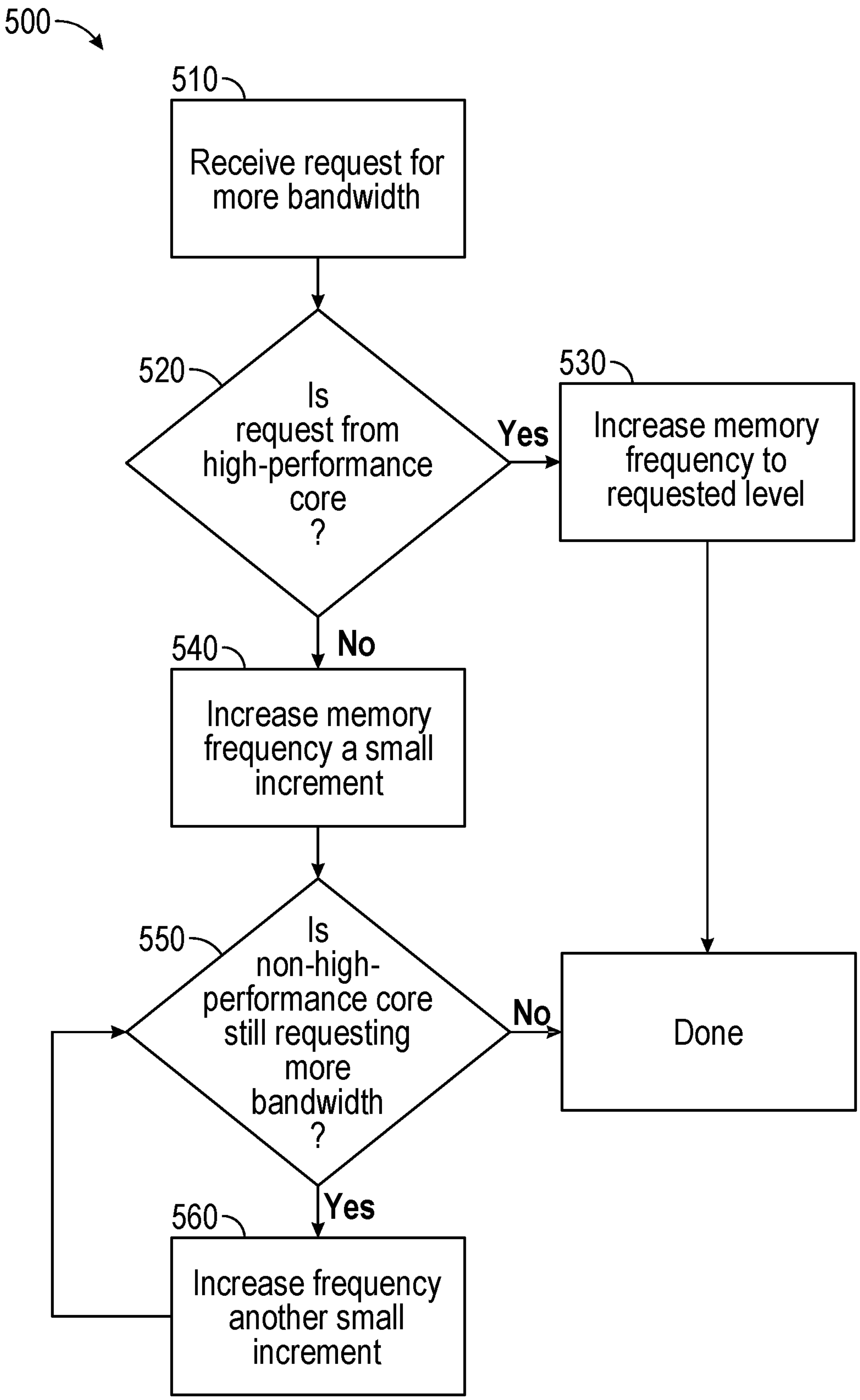
FIG. 5 illustrates a frequency optimization process according to various embodiments.

FIG. 5 illustrates a frequency optimization process 500 according to various embodiments. A request for more bandwidth is received from a core, block 510. A determination is made whether the core is a high-performance core, block 520. If the request is from a high-performance core, the frequency of memory may be increased to the requested level, block 530. If not, the frequency of memory is increased a small amount, but not necessarily to the requested level, block 540. After a period of time according to a set hysteresis threshold, a determination is made whether the non-high-performance core is still requesting more bandwidth, block 550. If the core is still requesting more bandwidth, the frequency is increased another small increment, block 560. Blocks 550 and 560 are repeated until either the non-high-performance core is no longer requesting more bandwidth or until a particular frequency has been reached, for example, a set maximum frequency.

According to alternate embodiments of frequency optimization process 500, when the request for more bandwidth is from a high-performance core, the memory frequency increase may also be only an incremental amount, although an amount larger than a frequency increase that would be provided for an energy-efficient core.

While process 500 is shown in simplified form, many considerations may also determine if memory frequency is adjusted according to various embodiments. For example, process 500 may consider energy performance preference and weight the preferences of high-performance cores higher than that of power-efficient cores. Additionally, hysteresis concerns may impact the decision such that frequency is not continually being adjusted up and down.

Figure 6:
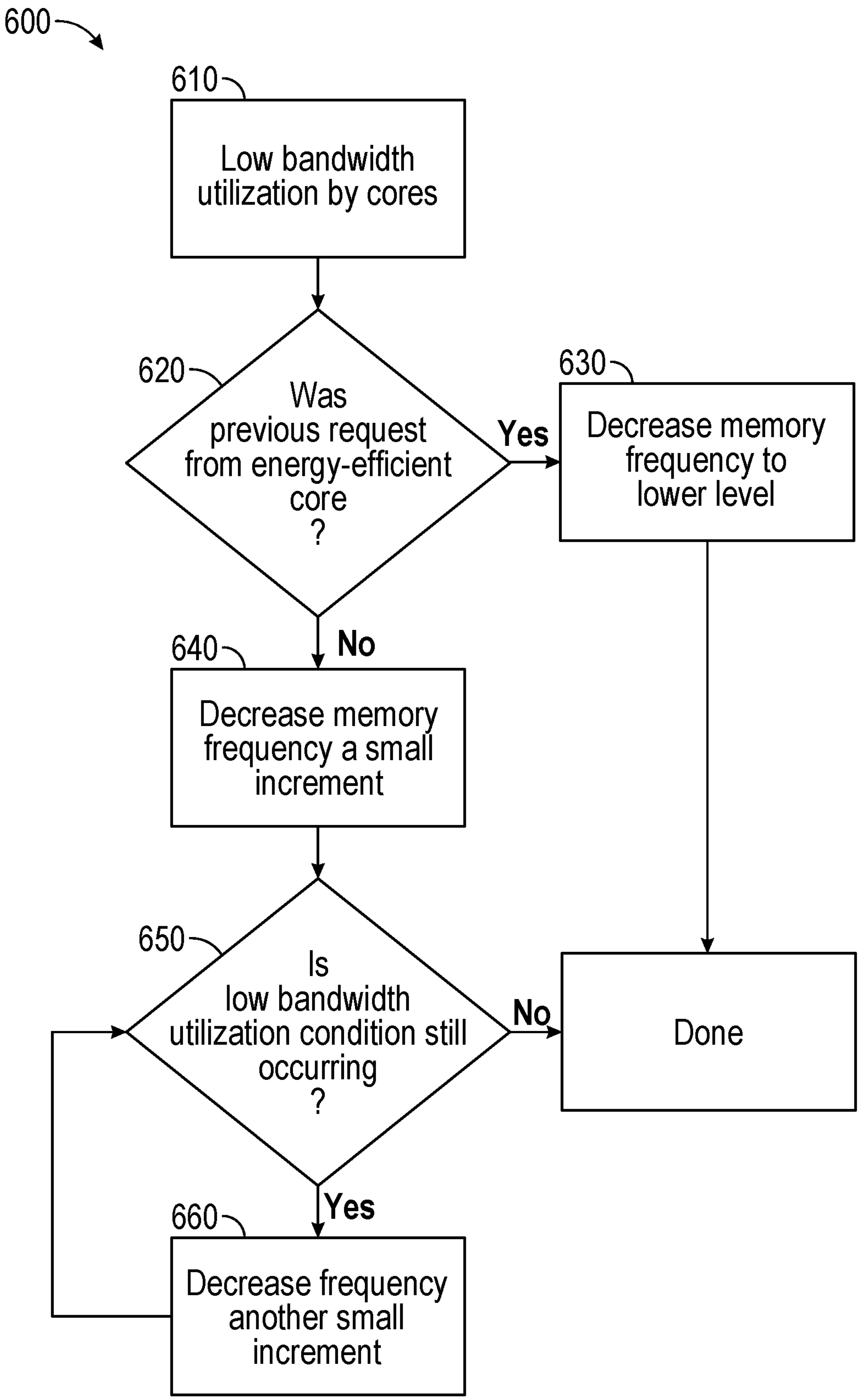
FIG. 6 illustrates another frequency optimization process according to various embodiments.

FIG. 6 illustrates another frequency optimization process 600 according to various embodiments. A low bandwidth utilization by cores occurs, block 610. A determination is made whether the previous request to increase bandwidth was from an energy-efficient core, block 620. If the core was an energy-efficient core, the frequency of memory may be decreased to a lower level, block 630. If the previous request is not from an energy-efficient core, the frequency of memory is decreased only a small amount, block 640. After a period of time according to a set hysteresis threshold, a determination is made whether the low bandwidth utilization condition is still occurring, block 650. If the condition is still occurring, the frequency is decreased another small increment, block 660. Blocks 650 and 660 are repeated until either the low traffic utilization condition is no longer occurring or until a particular frequency has been reached, for example, a set minimum frequency.

According to alternate embodiments of frequency optimization process 600, when the previous request for more bandwidth was from an energy-efficient core, the memory frequency may also be only decreased an incremental amount, although an amount larger than would be provided if the previous request was from a high-performance core.

According to another alternate embodiment of frequency optimization process 600, the decrease in frequency of the memory is always in small increments, regardless of what type of core made the previous request for an increase.

While process 600 is shown in simplified form, many considerations may also determine if memory frequency is adjusted according to various embodiments. For example, process 600 may consider energy performance preference and weight the preferences of high-performance cores higher than that of energy-efficient cores. Additionally, hysteresis concerns may impact the decision such that frequency is not continually being adjusted up and down.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

Examples

The following examples pertain to further embodiments. An example may be an apparatus, comprising a memory controller coupled to a first processing core and a second processing core, wherein the first processing core is a high-performance core and the second processing core is an energy-efficient core, the memory controller comprising: a frequency optimizer to receive a memory bandwidth increase request and to increase an operating frequency of a memory coupled to the first processing core and the second processing core, wherein the frequency optimizer to increase the operating frequency of the memory a larger increment if the first processing core requested the memory bandwidth increase request than if the second processing core requested the memory bandwidth increase request.

An example may include the frequency optimizer further to increase the operating frequency of the memory based on a weighted aggregated energy-performance preference of the first processing core and the second processing core.

An example may include wherein the weighted aggregated energy-performance preference is an average of a first weight times a first energy-performance preference of the first processing core and a second weight times a second energy-performance preference of the second processing core, wherein the first weight provides a bigger preference to the first energy-performance preference of the first processing core.

An example may include the frequency optimizer further to increase the operating frequency of the memory based on one of a first latency requirement of the first processing core, and a second latency requirement of the second processing core.

An example may include the frequency optimizer further to adjust the operating frequency of the memory lower if a low memory bandwidth utilization condition occurs.

An example may include wherein the frequency optimizer to adjust the operating frequency of the memory lower a larger increment if the memory bandwidth increase request was from the second processing core than if the memory bandwidth increase request was from the first processing core.

An example may include wherein the frequency optimizer to increase the operating frequency of the memory after a hysteresis threshold time has been met.

An example may include a system comprising: a first processing core; a second processing core; wherein the first processing core is a high-performance core and the second processing core is an energy-efficient core, and a frequency optimizer to receive a memory bandwidth increase request and to increase an operating frequency of a memory coupled to the first processing core and the second processing core, wherein the frequency optimizer to increase the operating frequency of the memory a larger increment if the first processing core requested the memory bandwidth increase request than if the second processing core requested the memory bandwidth increase request.

An example may include a method comprising: receiving a memory bandwidth increase request from one of a first processing core and a second processing core; wherein the first processing core is a high-performance core and the second processing core is an energy-efficient core; and increasing the operating frequency of the memory a larger increment if the first processing core requested the memory bandwidth increase request than if the second processing core requested the memory bandwidth increase request.

An example may include further increasing the operating frequency of the memory based on a weighted aggregated energy-performance preference of the first processing core and the second processing core.

An example may include wherein the weighted aggregated energy-performance preference is an average of a first weight times a first energy-performance preference of the first processing core and a second weight times a second energy-performance preference of the second processing core, wherein the first weight provides a bigger preference to the first energy-performance preference of the first processing core.

An example may include further adjusting the operating frequency of the memory lower if a low memory bandwidth utilization condition occurs.

An example may include further adjusting the operating frequency of the memory lower a larger increment if the memory bandwidth increase request was from the second processing core than if the memory bandwidth increase request was from the first processing core.

An example may include wherein increasing the operating frequency of the memory after a hysteresis threshold time has been met.

Another example may include an apparatus comprising means to perform one or more elements of a method described in or related to any of examples herein, or any other method or process described herein.

Another example may include one or more non-transitory computer-readable media comprising instructions to cause an electronic device, upon execution of the instructions by one or more processors of the electronic device, to perform one or more elements of a method described in or related to any of examples herein, or any other method or process described herein.

Another example may include an apparatus comprising logic, modules, or circuitry to perform one or more elements of a method described in or related to any of examples herein, or any other method or process described herein.

Another example may include a method, technique, or process as described in or related to any of examples herein, or portions or parts thereof.

Another example may include an apparatus comprising: one or more processors and one or more computer readable media comprising instructions that, when executed by the one or more processors, cause the one or more processors to perform the method, techniques, or process as described in or related to any of examples herein, or portions thereof.

Another example may include a signal as described in or related to any of examples herein, or portions or parts thereof.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:

a memory controller coupled to a first processing core and a second processing core, wherein the first processing core has a higher performance than the second processing core, the memory controller comprising:

a frequency optimizer configured to receive a memory bandwidth increase request and, based on the memory bandwidth increase request, to increase an operating frequency of a memory coupled to the memory controller, wherein the frequency optimizer is configured to increase the operating frequency of the memory in successive first increments based on the first processing core requesting the memory bandwidth increase request until the first processing core no longer requests a memory bandwidth increase, and to increase the operating frequency of the memory in successive second increments, smaller than the first increment, based on the second processing core requesting the memory bandwidth increase request until the second processing core no longer requests a memory bandwidth increase.

2. The apparatus of claim 1, wherein the frequency optimizer is further configured to increase the operating frequency of the memory based on a weighted aggregated energy-performance preference of the first processing core and the second processing core.

3. The apparatus of claim 2, wherein the weighted aggregated energy-performance preference is an average of a first weight times a first energy-performance preference of the first processing core and a second weight times a second energy-performance preference of the second processing core, wherein the first weight provides a bigger preference to the first energy-performance preference of the first processing core.

4. The apparatus of claim 1, wherein the frequency optimizer is further configured to increase the operating frequency of the memory based on at least one of a first latency requirement of the first processing core or a second latency requirement of the second processing core.

5. The apparatus of claim 1, wherein the frequency optimizer is further configured to adjust the operating frequency of the memory lower based on a low memory bandwidth utilization condition occurring.

6. The apparatus of claim 5, wherein based on the low memory bandwidth utilization condition occurring, the frequency optimizer is configured to lower the operating frequency of the memory in successive first decrements based on the memory bandwidth increase request being from the second processing core until the low memory bandwidth utilization condition no longer occurs, and to lower the operating frequency of the memory lower in successive second decrements, smaller than the first decrements, based on the memory bandwidth increase request being from the first processing core until the low memory bandwidth utilization condition no longer occurs.

7. The apparatus of claim 1, wherein the frequency optimizer is further configured to increase the operating frequency of the memory after a hysteresis threshold time has been met.

8. The apparatus of claim 1, wherein the first processing core has a higher performance than the second processing core based on the first processing core being configured to run a foreground application and the second processing core being configured to run a background process.

9. The apparatus of claim 1, wherein the first processing core has a higher performance than the second processing core based on the first processing core having a higher quality of service requirement than the second processing core.

10. The apparatus of claim 1, wherein the first processing core has a higher performance than the second processing core based on the first processing core being larger than the second processing core.

11. A system, comprising:

a processing core; and a frequency optimizer configured to receive a memory bandwidth requirement from the processing core, determine a scaling factor based on a performance level of the processing core, and determine an operating frequency of a memory coupled to the processing core, wherein to determine the operating frequency, the frequency optimizer is configured to compare the memory bandwidth requirement to a theoretical bandwidth that is scaled by the scaling factor for each of different frequencies until a lowest frequency is reached that results in the memory bandwidth requirement being less than the theoretical bandwidth that is scaled by the scaling factor, wherein different values of the theoretical bandwidth correspond to the different frequencies.

12. The system of claim 11, wherein the scaling factor is a decreasing function of the performance level.

13. The system of claim 11, wherein the lowest frequency satisfies the memory bandwidth requirement.

14. A method, comprising:

receiving a memory bandwidth increase request from one of a first processing core and a second processing core; wherein the first processing core has a higher performance than the second processing core; and increasing an operating frequency of the memory in successive first increments until the first processing core no longer requests a memory bandwidth increase based on the first processing core requesting the memory bandwidth increase request, and increasing the operating frequency of the memory in successive second, smaller than the first increments, until the second processing core no longer requests a memory bandwidth increase, based on the second processing core requesting the memory bandwidth increase request.

15. The method of claim 14, wherein the increasing of the operating frequency of the memory is based on a weighted aggregated energy-performance preference of the first processing core and the second processing core.

16. The method of claim 15, wherein:

the weighted aggregated energy-performance preference is an average of a first weight times a first energy-performance preference of the first processing core and a second weight times a second energy-performance preference of the second processing core; and the first weight provides a bigger preference to the first energy-performance preference of the first processing core.

17. The method of claim 14, further comprising adjusting the operating frequency of the memory lower based on a low memory bandwidth utilization condition occurring.

18. The method of claim 17, further comprising adjusting the operating frequency of the memory lower by a larger increment based on the memory bandwidth increase request being from the second processing core compared to the memory bandwidth increase request being from the first processing core.

19. The method of claim 14, further comprising increasing the operating frequency of the memory after a hysteresis threshold time has been met.

20. The method of claim 14, wherein the first processing core has a higher performance than the second processing core based on the first processing core being larger than the second processing core.

* * * * *